US010845557B2

(12) United States Patent
Di Ciommo et al.

(10) Patent No.: US 10,845,557 B2
(45) Date of Patent: Nov. 24, 2020

(54) OVERHEAD CABLE FOR THE TRANSMISSION OF LOW-VOLTAGE AND MEDIUM-VOLTAGE ELECTRIC POWER AND DIGITAL SIGNAL, ALUMINUM ALLOY CONCENTRIC CONDUCTORS WITH A FIBER-OPTIC CABLE INSIDE AND DRAWN WIRE TREATMENT PROCESS

(71) Applicants: José Antonio Di Ciommo, Prov. de Buenos Aires (AR); Edgardo Kliewer, Prov. de Buenos Aires (AR)

(72) Inventors: José Antonio Di Ciommo, Prov. de Buenos Aires (AR); Edgardo Kliewer, Prov. de Buenos Aires (AR)

( * ) Notice: Subject to any disclaimer, the term of this patent is extended or adjusted under 35 U.S.C. 154(b) by 0 days.

(21) Appl. No.: 16/339,526

(22) PCT Filed: Oct. 2, 2017

(86) PCT No.: PCT/IB2017/056068
§ 371 (c)(1),
(2) Date: Apr. 4, 2019

(87) PCT Pub. No.: WO2018/065881
PCT Pub. Date: Apr. 12, 2018

(65) Prior Publication Data
US 2020/0049914 A1 Feb. 13, 2020

(30) Foreign Application Priority Data

Oct. 4, 2016 (AR) .......................... P20160103035

(51) Int. Cl.
*G02B 6/44* (2006.01)
*H01B 1/02* (2006.01)
*H01B 9/00* (2006.01)

(52) U.S. Cl.
CPC .......... *G02B 6/4422* (2013.01); *G02B 6/442* (2013.01); *G02B 6/4486* (2013.01); *H01B 1/023* (2013.01);
(Continued)

(58) Field of Classification Search
CPC .... G02B 6/4422; G02B 6/442; G02B 6/4486; H01B 9/005; H01B 9/003; H01B 9/008; H01B 1/023
See application file for complete search history.

(56) References Cited

U.S. PATENT DOCUMENTS 1,707,935 A   4/1929  Logie
2,018,461 A  10/1935  Morgan
(Continued)

FOREIGN PATENT DOCUMENTS

GB      265640 A    2/1927
JP   S57-202006 A  12/1982

OTHER PUBLICATIONS

Buchholz, Finding the Root Cause of Power Cable Failures, EET&D Magazine Nov./Dec. 2004 (Year: 2004).*
(Continued)

*Primary Examiner* — Andrew Jordan
(74) *Attorney, Agent, or Firm* — Nixon & Vanderhye (57) ABSTRACT

An overhead cable for the transmission of low-voltage and medium-voltage energy and digital signals, including a central fiber-optic cable, surrounded by a protective covering of the central fiber-optic cable and around such protective covering of such fiber optics by at least an aluminum alloy layer for the transmission of low-voltage and medium-voltage electric power or neutral wire and the covering thereof, where at least one aluminum alloy layer includes a 6101 aluminum alloy wire that has been heat treated, submitting the same to a temperature within a range of 260 and (Continued)

300° C. and a treatment process for the aluminum alloy drawn wire.

18 Claims, 6 Drawing Sheets

(52) U.S. Cl.
CPC ............ *H01B 9/003* (2013.01); *H01B 9/005* (2013.01); *H01B 9/008* (2013.01)

(56) References Cited

U.S. PATENT DOCUMENTS

| | | | | |
|---|---|---|---|---|
| 3,104,189 | A * | 9/1963 | Wagner | B21C 23/002 148/415 |
| 3,261,907 | A * | 7/1966 | Morrison | H01B 9/04 174/115 |
| 4,138,275 | A | 2/1979 | Yokota et al. | |
| 5,102,700 | A * | 4/1992 | Baldi | B22F 7/002 216/100 |
| 5,262,466 | A * | 11/1993 | Baldi | B01J 25/00 524/430 |
| 5,464,699 | A * | 11/1995 | Baldi | B01J 25/00 102/364 |
| 5,732,875 | A | 3/1998 | Ziemek et al. | |
| 6,291,057 | B1 * | 9/2001 | Fujita | C04B 35/65 428/293.4 |
| 7,614,539 | B2 * | 11/2009 | Sankaran | B23K 20/1205 148/535 |
| 7,696,430 | B2 | 4/2010 | Santos Lopez et al. | |
| 7,931,875 | B2 * | 4/2011 | Tonkovich | F28D 9/0093 422/211 |
| 8,383,054 | B2 * | 2/2013 | Tonkovich | F23C 99/006 422/211 |
| 8,701,270 | B2 * | 4/2014 | Wang | H02K 15/0012 29/598 |
| 8,809,681 | B2 * | 8/2014 | Madden | H02G 9/12 174/110 R |
| 8,999,079 | B2 * | 4/2015 | Kamat | C22C 21/10 148/417 |
| 9,005,552 | B2 * | 4/2015 | Watanabe | B01J 23/755 422/627 |
| 9,192,929 | B2 * | 11/2015 | Tonkovich | B01J 37/0225 |
| 9,194,028 | B2 * | 11/2015 | Kamat | C22C 21/10 |
| 9,249,484 | B2 * | 2/2016 | Kamat | C22C 21/10 |
| 9,359,660 | B2 * | 6/2016 | Kamat | C22C 21/10 |
| 9,934,887 | B2 * | 4/2018 | Deighton | H01B 7/045 |
| 10,049,785 | B2 * | 8/2018 | Nielsen, Jr. | H01B 7/045 |
| 10,307,141 | B2 * | 6/2019 | Venkataramani | A61B 5/0033 |
| 10,550,455 | B2 * | 2/2020 | Hosch | C22F 1/002 |
| 10,556,323 | B2 * | 2/2020 | Alkhas | B24D 3/28 |
| 2004/0033455 | A1 * | 2/2004 | Tonkovich | F28D 9/0093 431/7 |
| 2006/0054252 | A1 * | 3/2006 | Sankaran | B23K 20/122 148/535 |
| 2006/0183625 | A1 * | 8/2006 | Miyahara | C04B 41/009 501/98.4 |
| 2006/0254793 | A1 * | 11/2006 | Santos Lopez | H01B 9/006 174/36 |
| 2007/0042907 | A1 * | 2/2007 | Nagasawa | B41M 5/3333 503/201 |
| 2008/0025884 | A1 * | 1/2008 | Tonkovich | F23C 99/006 422/600 |
| 2011/0175484 | A1 * | 7/2011 | Wang | H02K 17/18 310/211 |
| 2011/0300039 | A1 * | 12/2011 | Tonkovich | B01J 19/0093 422/603 |
| 2012/0055588 | A1 | 3/2012 | Kamat et al. | |
| 2012/0055589 | A1 * | 3/2012 | Kamat | C22C 21/10 148/551 |
| 2012/0055590 | A1 * | 3/2012 | Kamat | C22C 21/10 148/551 |
| 2012/0055591 | A1 * | 3/2012 | Kamat | C22C 21/10 148/551 |
| 2012/0061123 | A1 | 3/2012 | Deighton et al. | |
| 2012/0063963 | A1 * | 3/2012 | Watanabe | B01J 37/036 422/149 |
| 2012/0234597 | A1 * | 9/2012 | Madden | H02G 9/12 174/74 R |
| 2012/0256224 | A1 * | 10/2012 | Hatanaka | C25D 11/04 257/98 |
| 2014/0020796 | A1 * | 1/2014 | Sekiya | H01B 1/023 148/550 |
| 2014/0138115 | A1 * | 5/2014 | Karlsen | H01B 7/2813 174/24 |
| 2014/0246625 | A1 * | 9/2014 | Tonkovich | B01J 21/005 252/373 |
| 2014/0248177 | A1 | 9/2014 | Kamat et al. | |
| 2016/0115577 | A1 | 4/2016 | Kamat et al. | |
| 2016/0122852 | A1 | 5/2016 | Kamat et al. | |
| 2016/0160333 | A1 * | 6/2016 | Hosch | C22F 1/043 148/551 |
| 2017/0107419 | A1 * | 4/2017 | Roy | C22C 1/0416 |
| 2017/0226615 | A1 * | 8/2017 | Imasato | C22F 1/047 |
| 2017/0266729 | A1 * | 9/2017 | Roy | B22F 3/20 |
| 2017/0355016 | A1 * | 12/2017 | Roy | E21B 33/12 |
| 2018/0036866 | A1 * | 2/2018 | Alkhas | B24D 3/00 |
| 2018/0202039 | A1 * | 7/2018 | Ferrasse | C23C 14/3414 |
| 2018/0304368 | A1 * | 10/2018 | Roy | B22F 3/02 |
| 2020/0049914 | A1 * | 2/2020 | Di Ciommo | H01B 9/005 |
| 2020/0123070 | A1 * | 4/2020 | Belov | C04B 28/26 |
| 2020/0139513 | A1 * | 5/2020 | Alkhas | B24D 3/28 |

OTHER PUBLICATIONS

Antunes et al., Mechanical Properties of Optical Fibers, Chapter 19, Feb. 2012 (Year: 2012).*
Bronal S.A. Test Report, Sep. 16, 2017 (Year: 2017).*
International Search Report and Written Opinion, dated Feb. 9, 2018, from corresponding PCT application No. PCT/IB2017/056068.

* cited by examiner

OVERHEAD CABLE FOR THE TRANSMISSION OF LOW-VOLTAGE AND MEDIUM-VOLTAGE ELECTRIC POWER AND DIGITAL SIGNAL, ALUMINUM ALLOY CONCENTRIC CONDUCTORS WITH A FIBER-OPTIC CABLE INSIDE AND DRAWN WIRE TREATMENT PROCESS

OBJECT OF THE INVENTION

The invention refers to a cable, basically an overhead cable containing inside a fiber-optic cable comprised of one to four layers of aluminum-and its alloys-wires insulated each by an insulating plastic covering. The outer fiber-optic cable covering may have anti-tracking features. The aluminum-alloy layers of wires in this invention comprise concentric conductors which are suitable for the transmission of electric power in low-voltage networks and for medium-voltage networks protected against accidental contacts, as mounted on insulators. It also refers to a method for the heat treatment of aluminum-alloy drawn wire.

TECHNICAL FIELD OF THE INVENTION

This invention is related to the electric power field, more specifically, to the cables used for the electric cables and data transmission cables containing a central fiber-optic cable and to the processes for the treatment of aluminum alloy drawn wires inside the cables.

BACKGROUND

The electric power distribution in rural populated areas, suburban areas, or in not very populated urban areas is currently performed with aluminum alloy conductors, which are separated between each other between 20 and 30 cm, and installed on glass or porcelain insulators on poles or brackets fastened to the building facades.

To avoid the accidental contact hazard, conductors coated with a PVC compound or polyethylene layer are frequently used, in particular, when they may be easily accessed by persons, or when the lines are installed in areas with trees; in such cases, that layer has only a protective nature and it is not exclusively an insulator, for which, their installation is performed the same as in the case of bare conductors.

The method of building an electric network mentioned above was the simplest and most economic method used until a few years ago, but the increasing number of users and the constant increase in usage cause more difficulties to maintain an efficient and a safe service provision.

In addition to the problem mentioned above, as the conductors are separated along the electrical grid, its configuration allows clandestine connections to such networks.

The installation of a derivation or secondary branch is referred as an unregistered residential connection. Anti-theft residential cables are cables designed for avoiding unregistered connections and the theft of electric power through such cables.

A manner to avoid an unregistered connection is to use multi-conductor cables containing 2, 3 or 4 insulated conductors inside the same cable, also called concentric cables (due to their configuration); in such cables, the close proximity of the insulated cables causes unregistered connections to have short-circuit in the phases, which is very hazardous for the persons who steal the energy.

As examples of such cables, the following patents may be mentioned:

U.S. Pat. No. 2,018,461 A patent shows a multi-conductor cable with sector-shaped conductors that are insulated inside the same cable. Such cable is built based on three conductor cables with a concentric structure, alternate layers and then they are rolled by sectors, which are twisted such a manner to produce the multi-conductor cable.

U.S. Pat. No. 5,732,875 A patent refers to a method for manufacturing cables with sector insulated conductors, which—similarly to the invention mentioned above—have three sectors, in this case, each of the sectors on the conductors is inserted in a metal sheath.

U.S. Pat. No. 7,696,430 B2 patent refers to a metal conductor including a wire assembly with a certain polygonal cross-section. A multi-conductor cable is formed from a plurality of multi-wire conductors having a predetermined polygonal cross-section, which are electrically insulated.

The fiber optic is a dielectric filament, such as glass or acrylic polymers, capable of conducting and transmitting light pulses from end to the other; this allows telephone, television, data communications, etc., at a high speed and distance without requiring the use of electrical signals.

The first fiber-optic patents correspond to the GB265640 A British patent and to the U.S. Pat. No. 1,751,584 American patent.

An optical fiber is a means to transmit light between the two ends of the fiber which is habitually used in telecommunication and data networks, and consists of one or more very thin, transparent fiber(s) (made by drawing glass or plastic), through which light pulses are sent representing the data to be transmitted. The fiber-optic cable, with one optical fiber or more, transmits signals and have a polyethylene covering (or other insulating material) protecting them. The optical fiber may also be intruded or interfered for stealing signals.

The electric power and the signal contents have a supplier and a customer, they have a contractual relationship. An unauthorized access to a network has been defined in the contract as a crime. Damaging networks deliberately is an attempt against a public utility. Separation by height for electrical safety purposes is not a sufficient barrier to avoid unregistered connections or an act of vandalism.

The optical fiber by itself does not support the mechanical strains of the overhead network, which is why several cable constructions contain fiber optics and elements required for supporting the mechanical strain.

Including fiber optics in the high-voltage electrical grid has been contemplated in the cable called Optical Ground Wire (OPGW) or in the IEEE standard, comprising an overhead guard cable composed of fiber optics) is a type of cable used for building high-voltage electric power transmission and distribution lines. Such cable combines the functions of grounding and communication. The OPGW cable contains a tubular structure with one or more optical fibers in it, surrounded by layers of steel and aluminum wire. This is an example of the use of Fiber Optics in electrical networks.

The galvanized steel cable of the fiber optic cable has a resistivity 8 times higher than the copper, and 5 times higher than aluminum resistivity. Stainless steel cable is 30 times more resistive than the aluminum.

In a 50 mm2 an aluminum cable, it may be circular, of 130 amperes of continuous current; now with the same galvanized steel cross-section and with the same passage of current under the same conditions as for the aluminum cable mentioned above, the rope has losses, such that it becomes a heating wire, causes a voltage drop higher than 5% between the connection ends. In turn, the heat causes destruction of the internal Optical Fiber.

OPGW is a bare cable used as a guard wire in high-voltage transmission lines. The fiber-optic cable is covered with a stainless-steel tube. The stainless-steel tube with the fiber-optic cable inside is wired inside a galvanized steel cable. The galvanized steel cable grounds the current discharged when a lightning strikes. The fiber-optic cable transmits the digital signals for operation of the line.

The OPPC is a bare cable used as a phase cable in a high-voltage transmission line. The stainless-steel tube is installed—together with the steel wires—to a cord (steel covered by aluminum), on such cord one or more aluminum layers are stranded. The cable transmits the high-voltage line phase current through the bare aluminum, without insulation. The fiber-optic cable transmits the digital signals for operation of the line.

The WRAP cables with mounted fiber-optic cables are those where the fiber optics is fastened onto a phase conductor or onto a ground conductor.

The fiber-optic ADSL cable comprises the Asymmetric Digital Subscriber Line consists in the analogical transmission of digital data supported in the symmetric pair copper cable that carries the conventional or subscriber line.

In medium-voltage lines protected against accidental contacts, the layers transmit the total current of one system phase, the cable has partial insulation with respect to the ground (it is not bare) and is mounted on high-voltage insulators.

A way to protect the optical fiber against clandestine connections and vandalism is inserting it inside a multi-conductor cable where any intrusion produces a short-circuit of the electric conductive phases, which is hazardous for the infringer, who should avoid such risk.

The use of concentric layers of wires around the optical fiber achieves the best protection against furtive connections, since it is practically impossible to insert metal conductors, and more specifically, the optical fiber due to a potential short-circuit that endangers the infringer with the activation of protections and intrusion warnings.

For the connection of the conductive phases and the neutral wire corresponding to the anti-theft concentric multi-layer cable, it is required in the cable end to remove the first plastic insulation covering the external layer for a minimum length of 0.40 m. Then, after opening all the concentric layer wires, the subsequent internal insulation is exposed, separating the wires from their helical layer arrangement, gathering them (twisting themselves) manually outside the cable forming a conductor of wires with all the strands composing the such layer, it should be manually twisted from the point where the insulation was removed towards the end.

The number of times to be twisted will be the number determined for the entire assembly to allow the insertion of such end into any connection terminal.

This repeats on each concentric layer of the cable. The cutting distance will be on each new internal layer to be gathered of 0.04 m lower than the preceding external insulation covering the layer of conductive wires.

Example: the first layer: 0.4 m, the second layer: 0.36 m, the third layer: 0.32 m, the fourth layer: 0.28 m.

Such measures may vary if the conductors are required to be manually prepared, assembled by separation, gathered and twisted as explained above, based on the user-defined connection schemes.

In all this connection process or similar, as determined, under no circumstances should wires get broken or detached from the original formation, maintaining their number along the entire process for all the layers, to ensure the continuity of the conductors' section.

All the conductors so gathered, separately from each other will be insulated with self-fusing tape. The conductors formed as explained above are connected to the terminal board or the power bus-bar.

The released optical fiber cable will be joined or connected to the respective terminal boards.

An issue in the combination of fiber optics and concentric multi-conductor cables is caused by the different coefficient of expansion of such fiber optics with respect to the cable metal components; another issue in concentric multi-conductor cables with fiber optics installed arises when the fiber optics get broken due to their stretching with the lapse of time, an event known as "creep effect".

In concentric multi-conductor cables, the alloy known as 6101 is one of the alloys that is mostly used in the world due to its mechanical qualities.

The 6101 aluminum alloy specifications are provided by the Aluminum Association, which since 1988 has been sorting out Registration Data on International Aluminum Designations and Limits of Compositions for products manufactured with aluminum and aluminum alloys; the typical values may be read below:

TABLE 1

Chemical composition of the 6101-aluminum alloy

| Designation | Si | Fe | Cu | Mn | Mg | Cr | Zn | Ti | Others Individual | Total | Al min |
|---|---|---|---|---|---|---|---|---|---|---|---|
| 6101 | 0.3-0.7 | 0.5 | 0.10 | 0.03 | 0.35-0.8 | 0.03 | 0.1 | — | 0.05 | 0.1 | other |

The 6201 alloy is harder and less electrically conductive. It is used in the American sphere of influence (ASTM standards) because the mechanical values are privileged over the electrical values there.

The 1350 or 1370 (ASTM B 609) alloy is the same as the 8000 series alloys (ASTM B800), in their annealed condition, temple 0, present good malleability but low mechanical strength values, 100-150 MPa of breaking strain. Such annealed materials are used in fixed installations inside premises, but are not used for overhead lines. In overhead lines, they are subject to stretching due to mechanical strength, though the cable usually has no failures because the insulators are usually subject to an ultimate elongation higher than 150%, they may not contain fiber optics. Such wires allow no mechanical stretching, and are not suitable for overhead lines.

In Central America and the Caribbean, the 8000 series alloy connection cables are used, as the cable is taken inside the premises. NFPA 70 Regulations. This is as a result of a US Supreme Court decision in a case of fire caused by a 1350 series cable where a wrongly performed joint caused a fire with many injured persons.

An important issue to be solved to this date is to find an alloy that is adequate for concentric multi-conductors which is not subject to stretching and allows inserting the optical fiber without breaking it.

U.S. Pat. No. 4,138,275 (A) patent refers to A method of manufacturing an aluminum alloy for electric conductors is obtained by casting an aluminum-iron alloy into an ingot and heating it at 500°-630° C. for 0.5-48 hours. Such patent does not provide a process whereby a drawn aluminum wire may change its properties for a later thermal process.

The family of patents corresponding to the applications US2012055588 (A1), US2016122852(A1), US2016115577 (A1), US2014248177 (A1) all of which refer to 7xxx aluminum alloy bodies and methods of producing them. They may be produced by preparing the aluminum alloy body for post-solubilization; such process is intended for obtaining an improved strength and uniformity. These applications contemplate processes that are previous to the mechanical work; therefore, their properties are lost after such mechanical work.

This invention discloses a thermal treatment that may be performed on a drawn aluminum alloy wire that grants it malleability and a coefficient of stretching that makes it applicable for its use together with fiber optics; even this novel process has the advantage that it may be repeated in case the wire needs to be drawn again.

SUMMARY OF THE INVENTION

This invention refers to an overhead cable for the transmission of low-voltage and medium-voltage energy and digital signals, comprising a central fiber-optic cable, surrounded by a protective covering of the central fiber-optic cable and around such protective covering of such fiber optics by at least an aluminum alloy layer for the transmission of low-voltage and medium-voltage electric power and the layer thereof, in which at least one aluminum alloy layer comprises a 6101 aluminum alloy wire that has been heat treated, submitting the same to a temperature within a range of 260 and 300° C.

In one of preferred variants of overhead cable for the transmission of low-voltage and medium-voltage electric power and digital signals, it comprises a central fiber-optic cable, surrounded by a protective covering for the central multi-fiber fiber-optic cable.

Among the preferred variants of overhead cable for the transmission of low-voltage and medium-voltage electric power and digital signals, comprising a central fiber-optic cable surrounded by a protective covering of the central fiber-optic cable has around such protective covering of the fiber optics at least two aluminum alloy layer for the transmission of low-voltage and medium-voltage electric power.

The overhead cable for the transmission of low-voltage and medium-voltage electric power and digital signals, comprising a central fiber-optic cable surrounded by a protective covering of the central fiber-optic cable may have in one of its preferred variants around such protective covering of the fiber optics at least three aluminum alloy crowns for the transmission of low-voltage and medium-voltage electric power.

The overhead cable for the transmission of low-voltage and medium-voltage electric power and digital signals, comprising a central fiber-optic cable surrounded by a protective covering of the central fiber-optic cable has in one of its preferred variants around such protective covering of the fiber optics at least four aluminum alloy layer for the transmission of low-voltage and medium-voltage electric power.

In the overhead cable for the transmission of low-voltage and medium-voltage electric power and digital signals comprising a central fiber-optic cable surrounded by a protective covering for the central fiber-optic cable, between each aluminum alloy layer there is a layer covering for their electrical insulation.

In the overhead cable for the transmission of low-voltage and medium-voltage electric power and digital signals comprising a central fiber-optic cable surrounded by a protective covering for the central fiber-optic cable, as indicated above, external to the layer (crown), more separated from the central fiber-optic cable there is the last layer covering for the insulation of the cable with the environment.

In the overhead cable for the transmission of low-voltage and medium-voltage energy and digital signals, comprising a central fiber-optic cable, surrounded by a protective covering of the central fiber-optic cable and around such protective covering of such fiber optics by at least an aluminum alloy layer for the transmission of low-voltage and medium-voltage electric power and a layer covering, as indicated above, with at least one aluminum alloy layer comprising a 6101 aluminum alloy wire that has been heat treated, submitting the same to a temperature within a range of 260 and 300° C. during a minimum period of 6 to 8 hours.

In the overhead cable for the transmission of low-voltage and medium-voltage electric power and digital signals, comprising a central fiber-optic cable, surrounded by a protective covering of the central fiber-optic cable and around such protective covering of such fiber optics by at least an aluminum alloy layer for the transmission of low-voltage and medium-voltage electric power and a layer covering, such protective covering for the central fiber-optic cable comprises a material selected between cross-linked low-density polyethylene (XLPE), medium-density polyethylene (MXLPE), or high-density polyethylene (HDXLPE), polypropylene (PP), Polyvinyl chloride-based compounds (PVC), Ethylene-vinyl acetate (EVA)-based compounds, Ethylene propylene rubber-based elastomer compounds (EPR).

In the overhead cable for the transmission of low-voltage and medium-voltage electric power and digital signals, comprising a central fiber-optic cable surrounded by a protective covering of the central fiber-optic cable has at least one aluminum alloy layer for the transmission of low-voltage and medium-voltage electric power and a layer covering and the protective covering material for the central fiber-optic cable is anti-tracking.

In the overhead cable for the transmission of low-voltage and medium-voltage electric power and digital signals, comprising a central fiber-optic cable, surrounded by a protective covering of the central fiber-optic cable and around such protective covering of such fiber optics by at least an aluminum alloy layer for the transmission of low-voltage and medium-voltage electric power and a layer covering in accordance with the preferred variants, the layer that covering for the electrical insulation of the layers (crowns) comprises a material selected between low-density polyethylene (PELD), medium-density polyethylene (PEMD), or high-density polyethylene (PEHD), cross-linked low-density polyethylene (HDXLPE), polypropylene (PP), Polyvinyl chloride-based compounds (PVC), Ethylene-vinyl acetate (EVA)-based compounds, Ethylene propylene rubber-based elastomer compounds (EPR).

In the overhead cable for the transmission of low-voltage and medium-voltage electric power and digital signals, comprising a central fiber-optic cable surrounded by a protective covering of the central fiber-optic cable has at least an aluminum alloy layer for the transmission of low-voltage and medium-voltage electric power and a layer covering in accordance with the preference above, and the protective covering material for the layer is anti-tracking.

In the overhead cable for the transmission of low-voltage and medium-voltage electric power and digital signals, comprising a central fiber-optic cable surrounded by a protective covering of the central fiber-optic cable has at least one aluminum alloy layer for the transmission of low-voltage and medium-voltage electric power and a layer covering in accordance with the preferred variants, and the aluminum alloy layers comprise aluminum alloy drawn wire.

Also, one of the preferences of this invention refers to a treatment process for the 6101-aluminum alloy drawn wire of a diameter up to 5.95 mm comprised of the following stages:

(i) Introduce the 6101-aluminum alloy drawn wire of a diameter up to 5.95 mm in coils or baskets, such as they are delivered from the drawing machine into an air furnace at atmospheric pressure at a temperature within a range of 260° C. and 300° C.;

(ii) Leave it in the furnace until reaching the thermal equilibrium during 6 to 8 hours;

(iii) Take the 6101-aluminum alloy drawn wire out as coils or baskets after stages (i) to (ii) and leave it to cool down until the ambient temperature.

In one of the preference of the treatment process for the 6101 aluminum alloy drawn wire, as indicated above, in case a second drawing process is required, at diameters lower than 1.70 mm, the wire obtained in stage (iii) is left at ambient temperature for 48 hours before the second drawing, which allows rearrangement of the crystallographic structure; then, steps (i), (ii) and (iii) are repeated to provide the wire with a new diameter with the characteristics of malleability and absence of stretching, as desired.

BRIEF DESCRIPTION OF FIGURES

For a better understanding of this description, some illustrations have been attached hereto, which outline the main components and the space arrangement of the electric power cable with fiber optics of this invention. Such illustrations are presented as an example of a specific configuration, but they are not exhaustive of the possibilities of the invention fundamental concept.

DETAILED DESCRIPTION OF THE INVENTION

As indicated above, the invention cable comprises an overhead cable for the distribution of energy containing an optical fiber core which is separated by plastic insulating layers, manufactured, for example, with cross-linked polyethylene (or any other of the materials indicated below), and has also two to four aluminum alloy layers. Such layers are concentric with the central optical fiber.

The wire layers comprise an aluminum alloy that absorbs the mechanical strains of the overhead installation, and they have conductivity suitable for the transmission of high values of electric power with a low level of energy losses, caused by the heat generated in the conductors. The cable expansions and contractions are within the safe operation range of the fiber-optic cable. The thicknesses of the insulating covering allow the operation of the cable in overhead low-voltage three-phase lines or in three-phase lines with a neutral wire. With external insulations resistant to tracking and adequate thicknesses allow the cable operation in protected overhead medium-voltage lines.

Cable elongations are produced by mechanical strains due to the action of wind and by its own weight, as well as for the typical variation of temperature in the cable itself due to the heating caused by currents circulating through the aluminum layers and the ambient temperature variation. The cable final temperature results from the dissipation of heat and the ambient temperature. The short-circuit currents should be limited to avoid excessive heating of the wires and the resulting excessive expansion of the cable for the temperature. A service temperature for continuous service and a maximum short-circuit temperature are set to 5 seconds.

The thicknesses of the insulating covering ensure the low-voltage dielectric rigidity tests between layers, are resistant and distribute the mechanical strains of the metal layers towards the cable inside. For use in low-voltage cables, for each metal layer circulates the current of each of the three-phase system phases. For medium-voltage use, the phases on each end of the connection are short-circuited. The current is distributed to the layers proportionately, all the cable is at the same voltage as the ground, the cable is mounted on insulators and the outer covering is resistant to accidental contacts with grounded elements for short periods of time.

The inner layer design has two characteristics: it is an enclosed layer whose number of wires and diameter have a cross-section that is equal to or higher than the one required for the electrical resistance requested, and also the enclosed layer absorbs radial stresses.

The outer layer design has two characteristics: it is an enclosed layer whose number of wires and diameter have been selected to meet a cross-section that is equal to or higher than the one required for meeting the electrical resistance requested. The passage of cables is adjusted to cover the cable 95% minimum of its layer. The layer obtained by the enclosed cables of the aluminum alloy wires prevents the penetration of objects. Such property allows referring to it as "cable to prevent a fraudulent connection to the electric system."

The 6101 aluminum alloy wires have a specific heat treatment that confers ductility and resistance to bending fatigue stress. The aluminum alloy wires, based on IEC 60104, are only resistant to the wrapping test, and do not support being wrapped and unwrapped again.

The wire ductility is required for mounting the cable inside the cabinets. The cable must be flexible and malleable, the curvature radios required inside the cabinet are not compatible with the usual materials for overhead lines. The tampered wires are not arranged to a final position, have elastic memory (i.e., act as a spring) and trend to release from their connectors.

The electrical safety of users and installers of the electric power cable is achieved through dielectric tests on the cable and the installation, as contemplated in electrical regulations.

The electrical safety of users and installers of the fiber-optic cable is achieved by the distance between the live parts and the installer. The fiber-optic cable is separated from the metal layers and is conducted to a cabinet that is separated from the low-voltage parts. The cable joints and derivations are performed inside the specific cabinet. In case the medium-voltage cables are used, the layer covering of the fiber-optic cable must be of an insulating material that is resistant to tracking to go from the medium-voltage area to the distribution cabinet without any voltage.

Cable Elongation

For the electrical grid sections up to 70 m, where the cable is retained with forces lower than 300 daN, the elongation is produced by thermal expansion. The literature indicates for the aluminum and its alloys a thermal expansion coefficient of $23 \times 10^6$ ($1/°$ C.). For a cable whose manufacturing temperature is of 30° C. and the operation temperature is of 90° C. Thermal expansion of the cable $23 \times 10^{-6}$ ($1/°$ C.)$\times$(90-30) (° C.)=0.0014=>0.14%. For the case of a short-circuit increasing the temperature of the 3 phases to 160° C., the thermal expansion is $23 \times 10^{-6}$ ($1/°$ C.)$\times$(160-30) (° C.)=0.00299=>0.3%. A fiber-optic cable operates in optimal conditions up to 0.3% of its expansion (or 0.6%, as determined by other authors). For the retention forces in this case, the crowns operate within the range of application of the elastic limit of metals (Hooke's Law).

The literature indicates for the 6101-aluminum alloy elasticity module it is 60000 MPa.

Heat treatment of 6101 Aluminum Alloy wires.

The IEC 60104 standard defines 6201 & 6101 aluminum alloy wires, their condition is hard due to the mechanical work and heat treatment (usually 4 hours between 160 and 180° C.). Such drawn and heat-treated wires of alloy type B (A6101) have 53% conductivity with respect to the copper (32.53 ohm·mm2/km), 295 MPa breaking strain, ultimate elongation of 3.5%, specific weight of 2.73 kg/dm3 and a low malleability: as a result, this alloy fails to the bending fatigue stress. The IEC 60104-based wire is used for overhead electric power lines where the malleability is not a requirement for the manufacturing, installation, and use of the cable in overhead lines.

The low malleability is related to the heat treatment.

Unexpectedly, it has been found that a new treatment, through which the drawn wires of the alloy mentioned above are subject to a temperature within a range of 260 and 300° C. and a minimum heat treatment time of 6 to 8 hours to such temperature within a range of 260 and 300° C., the distribution of the chemical alloying elements of such alloy are changed (Si and Mg) within the crystalline structure by thermal agitation. As a result, improved plasticity and conductibility are obtained. The wire under such treatment improves the ultimate elongation (5%), conductivity (58.5% with respect to the copper), reaching a volumetric resistivity of 29.5 ohm·mm2/km, and a lower breaking load is obtained with values of about 200 MPa, and malleability is recovered (with which it has resistance to bending fatigue stress). This last property is very much valued for the installation as it allows manipulating wires without breaking them.

The wire thus obtained is used for conforming conductive layers, protecting the concentric multi-layer cable that is described in this invention.

An Example of the Aluminum Alloy Wire Obtained Used for the Tests Performed

The wire drawing process of the 6101-aluminum alloy wire to a final diameter and later heat treatment of artificial aging (by precipitating alloying elements), is part of the 6101A/T4 aluminum alloy wire rod, traction 158-170 MPa, Conductivity 51.8% IACS. The wire rod of 9.60 mm diameter is drawn in a drawing machine (with or without slipping) with mineral oil lubricant with 26% of reduction due to the passage until reaching 1.7 mm of final diameter. A metal coil or basket is obtained. When the final diameter is obtained, it is put inside an air furnace at atmospheric pressure and in a temperature between 260° C. and 300° C., once the furnace thermal equilibrium has been achieved, it is left in such regime for 6-8 hours. Then, the coils or baskets are taken out of the furnace and cooled at ambient temperature. Preferably, the wire is allowed to stand 48 hours before the second drawing at lower diameters, with which, the crystallographic structure may rearrange at ambient temperature. Samples are taken for testing, diameter, mechanical tension, ultimate elongation, volumetric resistivity and wrapping.

After the second drawing, the heat treatment steps are repeated, as indicated above, conferring the wire the properties sought, such as, they do not present any elongation and, thus, it allows they may be inserted in cables together with the fiber optics without breaking it.

The manner to determine the malleability of the wires for their later use in wiring and after that in the end product installation was performed as follows: Perform the winding test on its own diameter three subsequent times on the same probe, as follows: wind 8 turns, unwind 6 turns, wind 6 turns, unwind 6 turns, wind 6 turns; at the end of the test the wire has not broken or cracked.

To achieve diameters lower than 1.70 mm until reaching 0.5 mm, it is drawn again with a wire drawing machine with 26% of reduction for passage with mineral oil lubricant or synthetic or semi-synthetic oil dissolved in water and then, for the final diameter, the heat treatment mentioned above is repeated. The draws to be used may be sintered diamond, natural diamond or tungsten carbide, the reduction angles may be between 16° and 20°, the length of the cylinder may be between 20% and 30% of the diameter.

The aluminum drawn wire that is heat treated as indicated above has properties that make it unique for its use for manufacturing any type of low-voltage and medium-voltage cables.

Full Cable Production Process

The fiber-optic cable must be compliant with the applicable IEC standard. The cable must have the protective covering indicated above; otherwise, it must be applied with any of the indicated insulating materials. The diameter on the covering defines the design of the layers. The diameter on the protective covering must be smooth, uniform, without any protrusions or deformations, maximum out-of-roundness of 5%.

The aluminum alloy wires are installed on the fiber optics on a rigid strander (without any wire de-torsion) or planetary stranding (with wire de-torsion). The coil size containing the wire should be of a size as defined in DIN 400 for 1.70 mm wires and DIN 250 for diameters lower than 1.70 mm. Brakes must be adjusted in a manner to obtain a uniform surface on the wires installed, without any loose wires protruding the assembly. The appropriate tension required for tightening the wires during the cable installation is of 1 daN/mm$^2$, the appropriate tension for the fiber-optic cable cover should be provided by its supplier. The application of polyester helical wrapping to fasten the aluminum alloy wires and facilitate the following process is recommended.

The subsequent layers must be stranded with alternate directions to avoid the rotation of the cable during the assembly. Testing the electrical resistance of the layer at the beginning of the cable installation process is suggested. Dielectric rigidity tests of 3 kV A.C. may be performed for 5 minutes between metal layers insulated between each other with insulated material to check for the quality of the insulation process.

The insulation extrusion process is performed in an insulation extrusion line for cables. The use of an extruder is advised with a minimum screw and barrel diameter of 60 mm. A screw profile suitable for processing the compound to be used. The use of extrusion dies of the so called "tube" method where the compound is stretched and applied uniformly on the metal layer. Uniform thicknesses are preferred to perfect circular geometric figures. The use of a device is advised to decrease the atmospheric pressure inside the extrusion crosshead where the cable to cover goes through, to achieve a higher adherence of the covering to the layer. This device is usually a pipe with a T-derivation where suction is applied to achieve the depression inside the crosshead. Checking for the absence of failures by means of the voltage test between electrodes, based on the IRAM NM 244 or IEC 60092-350 annex D standard, or equivalent is advised. It is advisable for the diameters of the drums of reels should be at least 20 times the diameter of the layer or of the respective cover.

The drawing process, cable installation and extrusion process is repeated as many times as required for building the cable with the predefined layers. When the cable has been completed the ordinary tests for measurement of the electric resistance of the layers must be performed, as well as the dielectric rigidity test in water for the outer layer and the inner cable layers.

Design of Concentric Crowns

In this cable, the nominal section of the concentric metal layer and the value of the electrical resistance are the same for all the layers.

The increment of stranding of the ($ic$) layer is defined as ($ic$)=1/cos($\alpha$). (1)

Lay length (P) is defined as the stranding length of the layer in (mm).

(Dais) is defined as the diameter on the covering where the layer has been seated, in (mm).

The wire diameter in the layer (crown) (d) is in (mm).

The angle ($\alpha$) has been defined as the angle between the cable axis and the tangent of the wires arranged in the concentric layer helix.

Based on the considerations above, it is compliant:

Passage ($P$)=3.1416×(Dais+$d$)/$tg(\alpha)$ (2)

The design process begins with the passage of cables in 14×Dais for the inner layer, 12×Dais for the immediately adjacent layers and 10×Dais for the outer layer.

By solving tg($\alpha$) in the equation (2), the angle ($\alpha$) is obtained by means of the following calculation: arc·tg($\alpha$), and, finally, 1/cos($\alpha$) is calculated.

We defined the (Cob) coverage as the portion of the insulation surface (Dais) covered by the metal layer.

The number of wires in the metal layer (N) is a natural number.

The layer wire is inclined with respect to the cable axis, therefore, the surface projected over the circumference that goes through the center of the layer wires is slightly higher than its diameter, d/cos($\alpha$).

The coverage calculation has been defined by the following equation:

(Cov) (%)=$N*d$/cos($\alpha$)/(3.1416*(Dais+$d$))*100 (3)

The cross section of the layer is calculated as S (mm2) with the following equation:

$S$(mm2)=$N*(d)^2*3.1416/4$ (4)

Considering the volumetric resistivity $\rho$ in ($\Omega$·mm2/km) as the inverse of the electric conductivity, the electrical resistance calculated for the layer R (Q/km) with the following equation:

$R$($\Omega$/km)=$\rho*S$/cos($\alpha$) (5)

Taking into account the density of the aluminum alloy—based on the literature—is (kg/dm3), the M (kg/km) conductor mass is calculated based on the following equation:

$M$(kg/km)=$S*$density/cos($\alpha$) (6)

The number of wires and the wire diameter are the result of proving by successive approximations, which is the combination that produces the best coverage of about 95-100%, and that is compliant with the electrical resistance requirement.

Finally, the passage of cables from the layer is adjusted to achieve the coverage mentioned above. With a coverage of between 95 y 100%, it allows referring to it as "cable to prevent the fraudulent connection to the electric system."

The breaking load is calculated based on the following equation:

$T$(daN)=$S$(mm2)*$\sigma$(dan/mm2)*0.9 (7)

where $\sigma$ (dan/mm2)=Wire ultimate tensile stress to the traction

The nominal sections are defined for sorting out the different players in the electric sector, the standards define electrical resistance requirements, insulation thicknesses and test voltages, based on nominal sections. The values are verified by excess or defect, as they are defined. For example, the effective section in general fails to match the nominal section. In the cables included in the figures attached, in order to meet the minimum coverage of 95% to ensure anti-fraud functions, the effective section of each layer of wires may be higher than the nominal section. (See Table 1).

Insulating Materials

As insulating materials for the cable types described and mentioned in the figures attached, the following materials may be used: low-density polyethylene (PELD), medium-density polyethylene (PEMD), or high-density polyethylene (PEHD), cross-linked low-density polyethylene (HDXLPE), polypropylene (PP), Polyvinyl chloride-based compounds (PVC), Ethylene-vinyl acetate (EVA)-based compounds, Ethylene propylene rubber-based elastomer compounds (EPR). For medium-voltage they also meet the tracking characteristic.

Preferred Examples

Figure 1:
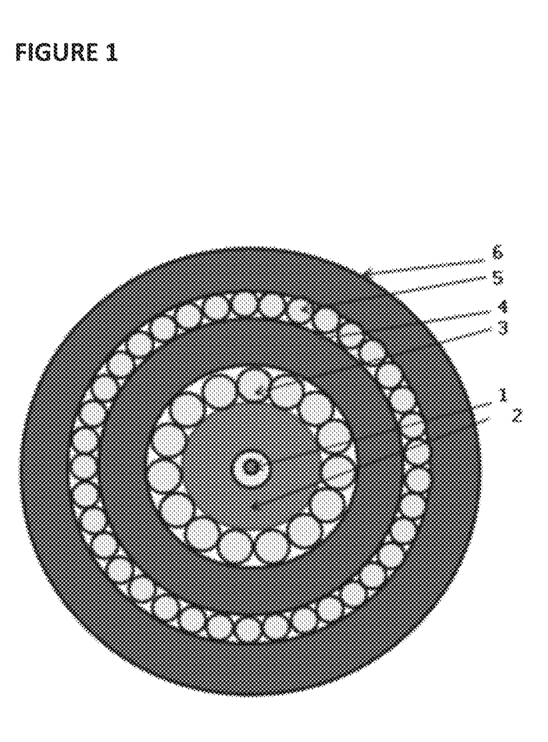
FIG. 1: Cable of an optical fiber with an outer diameter of 3.6 mm and with two aluminum alloy layer.

FIG. 1 displays a cable based on this invention, including a fiber-optic cable inside its protective tube (1) located on the central part, with a covering protection of insulating material for the fiber optics tube of 3.6 mm in diameter (2), which is surrounded by two aluminum alloy layers composed of a first aluminum alloy wire layer (3) and the second aluminum alloy wire layer (5); between the first and the second layer is the first layer covering (4) and the outside the second layer is the second layer covering (6). The design has been indicated in Table 2 in mm2 and Table 3 in AWG, which are attached.

Figure 2:
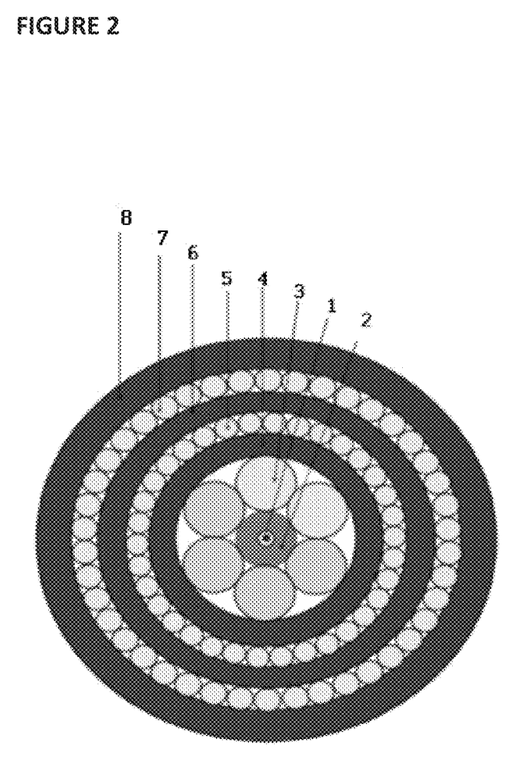
FIG. 2: Cable of an optical fiber with an outer diameter of 3.6 mm and with 3 aluminum alloy layer.

FIG. 2 displays another cable based on this invention, including a fiber-optic cable inside its protective tube (1) located on the central part, with a covering protection of insulating material for the fiber-optic tube of 3.6 mm in diameter (2), which is surrounded by three aluminum alloy layers composed of a first aluminum alloy wire layer (3) a second aluminum alloy wire layer (5) and a third aluminum alloy wire layer (7); between the second and the third layer is the second layer covering (4) and the outside the second layer is the second layer covering (6) and outside the third layer is the third layer covering (8). The design has been indicated in Table 2 in mm2 and Table 4 in AWG, which are attached.

Figure 3:
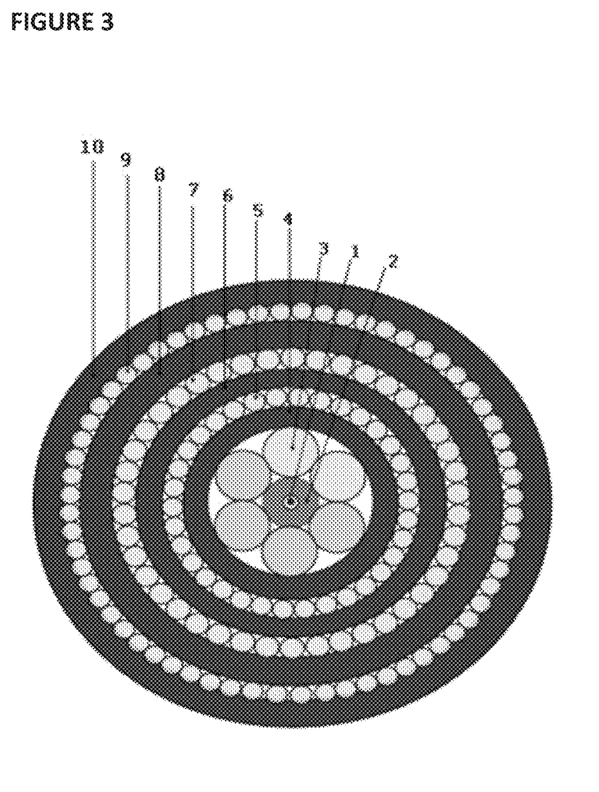
FIG. 3: Cable of one optical fiber with an outer diameter of 3.6 mm and with 4 aluminum alloy layer.

FIG. 3 displays another cable based on this invention, including a fiber-optic cable inside its protective tube (1) located on the central part, with a covering protection of insulating material for the fiber-optic tube of 3.6 mm in diameter (2), which is surrounded by four aluminum alloy layers composed of a first aluminum alloy wire layer (3) a second aluminum alloy wire layer (5) a third aluminum alloy wire layer (7) and a fourth aluminum alloy wire layer (9); between the first and the second layer is the first layer covering (4); between the second and third layer is the second layer covering (6) and between the third and fourth layer is the third layer covering (8) and outside the fourth layer is the fourth layer insulating covering (10). The design has been indicated in Table 2 in mm2 and Table 4 in AWG, which are attached.

Figure 4:
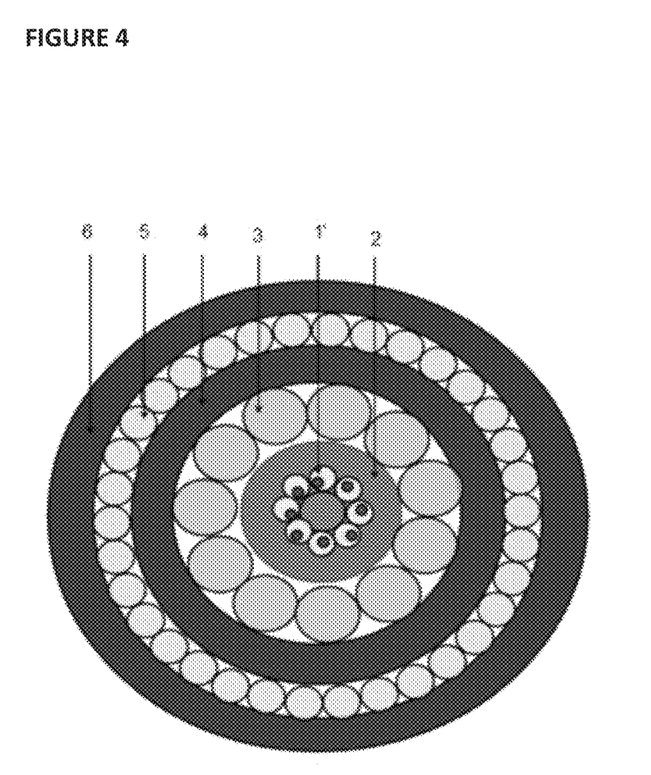
FIG. 4: Cable of one optical fiber with an outer diameter of 6 mm and with 2 aluminum alloy layer.

FIG. 4 displays a cable based on this invention, including a multi-fiber fiber-optic cable inside its protective tube (1') located on the central part, with a covering protection of insulating material for the fiber-optic tube of 6 mm in diameter (2), which is surrounded by two aluminum alloy layers composed of a first aluminum alloy wire layer (3) and the second aluminum alloy wire layer (5); between the first and the second layer is the first layer insulating covering (4) and the outside the second layer is the second layer insulating covering (6). The design has been indicated in Table 3 in mm2 and Table 5 in AWG, which are attached.

Figure 5:
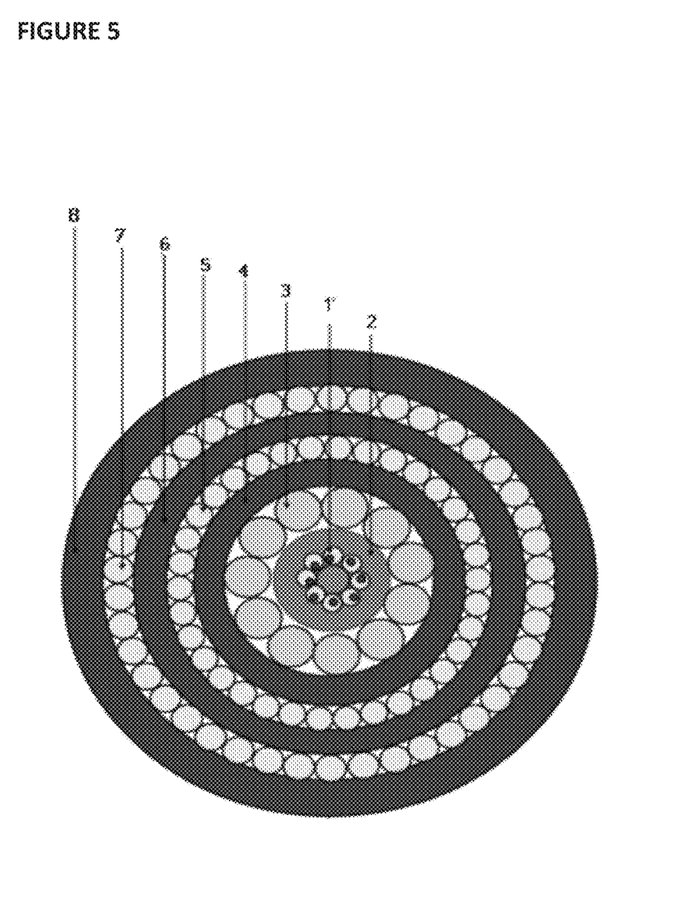
FIG. 5: Cable of one optical fiber with an outer diameter of 6 mm and with 3 aluminum alloy layer.

FIG. 5 displays another cable based on this invention, including a multi-fiber (1') fiber-optic cable on the central part with an insulating covering for protection of the fiber optics of 6 mm in diameter (2), which is surrounded by three aluminum alloy layers composed of a first aluminum alloy wire layer (3) a second aluminum alloy wire layer (5) and a third aluminum alloy wire layer (7); between the first and the second layer is the first layer covering (4); between the second and third layer is the second layer covering (6) and outside the third layer is the third layer covering (8). The design has been indicated in Table 3 in mm2 and Table 5 in AWG, which are attached.

Figure 6:
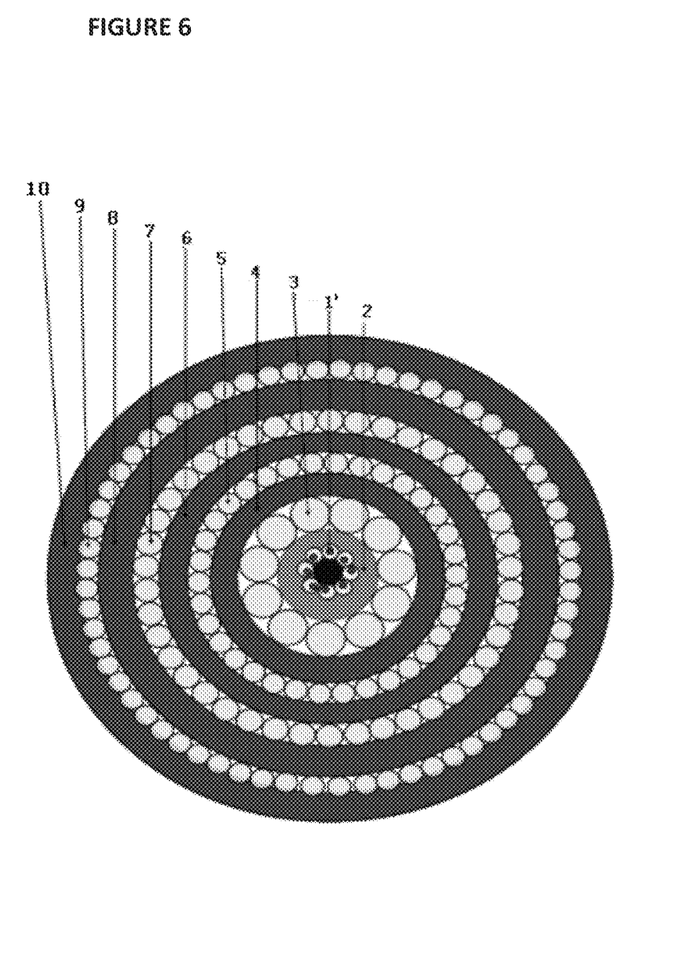
FIG. 6: Cable of one optical fiber with an outer diameter of 6 mm and with 4 aluminum alloy layer.

FIG. 6 displays another cable based on this invention, including a multi-fiber (1') fiber-optic cable on the central part, with a covering protection of insulating material for the fiber optics tube of 6 mm in diameter (2), which is surrounded by four aluminum alloy layers composed of a first aluminum alloy wire layer (3) a second aluminum alloy wire layer (5) a third aluminum alloy wire layer (7) and a fourth aluminum alloy wire layer (9); between the first and the second layer is the first layer covering (4); between the second and third layer is the second layer covering (6) and between the third and fourth layer is the third layer covering (8) and outside the fourth layer is the fourth layer insulating covering (10). The design has been indicated in Table 3 in mm2 and Table 5 in AWG, which are attached.

Characteristics of the Preferred Examples

The following examples display-without any limitation-suggested fiber-optic models built with 3.6 mm and 6 mm cables. Volumetric resistivity: 30.5 $\Omega \cdot mm^2/km$ (note: a resistivity value has been selected for the design that provides a broad margin of safety to obtain an electrical resistance value according to the standard): electric resistances under IEC 60228 standard for $mm^2$ sections and ICEA S76-474 for AWG sections.

TABLE 2

| A cable with a central fiber-optic cable of 3.6 mm in diameter and nominal sections in $mm^2$ | | | | | | | | | | |
|---|---|---|---|---|---|---|---|---|---|---|
| Diameter on Fiber Optics | mm | 3.6 | 3.6 | 3.6 | 3.6 | 3.6 | 3.6 | 3.6 | 3.6 | 3.6 |
| Nominal Section | $mm^2$ | 6 | 10 | 16 | 25 | 35 | 50 | 70 | 95 | 120 |
| Formation of 1st layer | | 19 × 0.70 | 15 × 0.94 | 11 × 1.42 | 9 × 1.9 | 7 × 2.88 | 6 × 3.9 | 6 × 3.9 | 5 × 5.9 | 5 × 5.9 |
| Passage | | 14 × D | 14 × D | 14 × D | 14 × D | 8.5 × D | 14 × D | 14 × D | 14 × d | 14 × D |
| Formation of 2nd layer | | 44 × 0.56 | 47 × 0.56 | 42 × 0.71 | 36 × 0.97 | 38 × 1.12 | 40 × 1.26 | 30 × 1.74 | 34 × 1.95 | 28 × 2.42 |
| Passage | mm | 12 × D | 11 × D | 12 × D | 12 × D | 12 × D | 12 × D | 12 × D | 12 × D | 12 × D |
| Formation of 3rd layer | | 64 × 0.56 | 66 × 0.56 | 72 × 0.56 | 70 × 0.69 | 68 × 0.86 | 68 × 1.0 | 54 × 1.33 | 54 × 1.64 | 52 × 1.77 |
| Passage | mm | 10 × D | 10.4 × D | 8.4 × D | 10 × D | 10 × D | 10 × D | 10 × D | 10 × D | 10 × D |
| Formation of 4th layer | | 72 × 0.56 | 72 × 0.56 | 72 × 0.6 | 72 × 0.75 | 72 × 0.9 | 72 × 1.05 | 72 × 1.20 | 72 × 1.40 | 72 × 1.50 |
| Passage | mm | 5 × D | 4.5 × D | 4.5 × D | 5.5 × D | 5.5 × D | 5.5 × D | 7 × D | 7 × D | 8 × D |
| Electrical Resistance at 20° C. | Ω Km | 4.61 | 3.08 | 1.91 | 1.2 | 0.868 | 0.641 | 0.443 | 0.32 | 0.253 |
| Thickness of Insulation | mm | 1.2 | 1.2 | 1.2 | 1.4 | 1.6 | 1.6 | 1.8 | 2.0 | 2.0 |

TABLE 3

A cable with a central fiber-optic cable of 6 mm in diameter and nominal sections in mm²

| | | | | | | | | | | |
|---|---|---|---|---|---|---|---|---|---|---|
| Diameter on Fiber Optics | mm | 6.0 | 6.0 | 6.0 | 6.0 | 6.0 | 6.0 | 6.0 | 6.0 | 6.0 |
| Nominal Section | mm² | 6 | 10 | 16 | 25 | 35 | 50 | 70 | 95 | 120 |
| Formation of 1st layer | | 36 × 0.56 | 30 × 0.69 | 22 × 0.98 | 16 × 1.44 | 12 × 2.09 | 11 × 2.35 | 9 × 3.15 | 8 × 3.93 | 7 × 4.78 |
| Passage | | 13.5 × D | 14 × D | 14 × D | 14 × D | 14 × D | 14 × D | 14 × D | 14 × D | 14 × D |
| Formation of 2nd layer | | 56 × 0.56 | 57 × 0.56 | 56 × 0.61 | 44 × 0.89 | 44 × 1.02 | 36 × 1.35 | 32 × 1.7 | 31 × 2.0 | 29 × 2.33 |
| Passage | mm | 12 × D | 10.5 × D | 12 × D | 12 × D | 12 × D | 12 × D | 12 × D | 12 × D | 12 × D |
| Formation of 3rd layer | | 72 × 0.56 | 72 × 0.56 | 72 × 0.61 | 72 × 0.7 | 72 × 0.82 | 70 × 0.95 | 56 × 1.33 | 56 × 1.51 | 52 × 1.76 |
| Passage | mm | 6.9 × D | 6.1 × D | 7.8 × D | 7.3 × D | 7.8 × D | 10.8 × D | 10 × D | 10 × D | 10 × D |
| Formation of 4th layer | | 72 × 0.56 | 72 × 0.56 | 72 × 0.61 | 72 × 0.75 | 72 × 0.9 | 72 × 1.0 | 72 × 1.20 | 72 × 1.35 | 72 × 1.50 |
| Passage | mm | 3.5 × D | 3.5 × D | 3.5 × D | 4.5 × D | 5 × D | 5 × D | 7 × D | 7 × D | 8 × D |
| Electrical Resistance at 20° C. | ΩKm | 4.61 | 3.08 | 1.91 | 1.2 | 0.868 | 0.641 | 0.443 | 0.32 | 0.253 |
| Thickness of Insulation | mm | 1.2 | 1.2 | 1.2 | 1.4 | 1.6 | 1.6 | 1.8 | 2.0 | 2.0 |

TABLE 4

A cable with a central fiber-optic cable of 3.6 mm in diameter and nominal sections in AWG

| | | | | | | | | | |
|---|---|---|---|---|---|---|---|---|---|
| Diameter on Fiber optics | mm | 3.6 | 3.6 | 3.6 | 3.6 | 3.6 | 3.6 | 3.6 | 3.6 |
| Section section | mm² | #8 | #6 | #4 | #2 | #1/0 | #2/0 | #3/0 | #4/0 |
| Formation 1st layer | | 16 × 0.87 | 12 × 1.25 | 9 × 1.9 | 7 × 2.89 | 6 × 3.9 | 6 × 3.9 | 5 × 5.95 | 5 × 5.95 |
| Passage | | 14 × D | 14 × D | 14 × D | 14 × D | 14 × D | 14 × D | 14 × D | 14 × D |
| Formation 2nd layer | | 46 × 0.56 | 44 × 0.65 | 40 × 0.86 | 38 × 1.12 | 34 × 1.46 | 30 × 1.74 | 36 × 1.83 | 30 × 2.24 |
| Passage | mm | 12 × D | 12 × D | 12 × D | 12 × D | 12 × D | 12 × D | 12 × D | 12 × D |
| Formation 3rd layer | | 66 × 0.56 | 71 × 0.56 | 72 × 0.65 | 68 × 0.86 | 60 × 1.12 | 54 × 1.33 | 64 × 1.36 | 54 × 1.68 |
| Passage | mm | 10 × D | 10 × D | 8.5 × D | 10 × D | 7.8 × D | 10.8 × D | 10 × D | 10 × D |
| Formation 4th layer | | 72 × 0.56 | 72 × 0.56 | 72 × 0.7 | 72 × 0.86 | 72 × 1.05 | 72 × 1.16 | 72 × 1.36 | 72 × 1.45 |
| Passage | mm | 4.5 × D | 4 × D | 4.5 × D | 4.5 × D | 6 × D | 7 × D | 6.5 × D | 8 × D |
| Electric Resistance a 20° C. | ΩKm | 3.51 | 2.21 | 1.391 | 0.872 | 0.551 | 0.436 | 0.344 | 0.274 |
| Thickness of insulation | mm | 1.2 | 1.2 | 1.4 | 1.6 | 1.6 | 1.8 | 2.0 | 2.0 |

TABLE 5

A cable with a central fiber-optic cable of 3.6 mm in diameter and nominal sections in AWG

| | | | | | | | | | |
|---|---|---|---|---|---|---|---|---|---|
| Diameter on Fiber optics | mm | 6.0 | 6.0 | 6.0 | 6.0 | 6.0 | 6.0 | 6.0 | 6.0 |
| Section section | mm² | #8 | #6 | #4 | #2 | #1/0 | #2/0 | #3/0 | #4/0 |
| Formation 1st layer | | 36 × 0.56 | 24 × 0.89 | 18 × 1.25 | 13 × 1.89 | 10 × 2.70 | 9 × 3.16 | 8 × 3.81 | 7 × 4.80 |

TABLE 5-continued

| A cable with a central fiber-optic cable of 3.6 mm in diameter and nominal sections in AWG | | | | | | | | | |
|---|---|---|---|---|---|---|---|---|---|
| Passage | | 14 × D | 14 × D | 14 × D | 14 × D | 14 × D | 14 × D | 14 × D | 14 × D |
| Formation 2nd layer | | 56 × 0.56 | 60 × 0.56 | 46 × 0.82 | 42 × 1.04 | 34 × 1.46 | 32 × 1.7 | 30 × 2.0 | 30 × 2.25 |
| Passage | mm | 12 × D | 12 × D | 12 × D | 12 × D | 12 × D | 11.5 × D | 10 × D | 12 × D |
| Formation 3rd layer | | 72 × 0.56 | 72 × 0.56 | 72 × 0.7 | 72 × 0.82 | 60 × 1.12 | 60 × 1.24 | 58 × 1.43 | 56 × 1.62 |
| Passage | mm | 6.9 × D | 5.4 × D | 9.5 × D | 10 × D | 10 × D | 10 × D | 10 × D | 10 × D |
| Formation 4th layer | | 72 × 0.56 | 72 × 0.65 | 72 × 0.75 | 72 × 0.9 | 72 × 1.05 | 72 × 1.12 | 72 × 1.35 | 70 × 1.50 |
| Passage | mm | 3.5 × D | 4.5 × D | 4.5 × D | 5 × D | 6 × D | 7 × D | 7 × D | 7 × D |
| Electric Resistance a 20° C. | ΩKm | 3.51 | 2.21 | 1.391 | 0.872 | 0.551 | 0.436 | 0.344 | 0.274 |
| Thickness of Insulation | mm | 1.2 | 1.2 | 1.4 | 1.6 | 1.6 | 1.8 | 2.0 | 2.0 |

Cable Installation

In low voltage, the distribution overhead line cable is installed and retained between poles with a walrus determined for its dimensions, ensuring that the cable is fastened and tightened and is not damaged anywhere and maintains its geometric configuration and also the mechanical, electrical and data transmission conditions.

Tensile Test on the Cable Wrapping:

The test was performed with a Bronal, model MAR9 anchoring clamp for ACSR 300/50 mm2 cable, or similar. The wrapping slid inside the anchoring clam at 1500 daN. A dielectric rigidity test of 2.5 kV was performed and the electrical resistance was measured for concentric conductors: the invention cable caused a successful result. This ensures the self-supporting condition without requiring a specific lashing wire outside the active conductive layers and, which have then a double function: as a combined conveyor and as electric power conductors.

On each connection point, the cable must be cut, opening each of its active functions.

Inside the distribution box, the connections required of each element need to be made to ensure a later branch and then a continuity connection to continue with the power and signal distribution towards the next delivery box, if any, based on the given network.

To avoid damage in the box due to mechanical strains at the cable inlet, it has to have the characteristics of flexibility, as a whole, to allow its bending and handling without damaging it, or the components related to the installation function on the distribution network.

On medium voltage, up to 35 kV, the cable is assembled on insulators or hangers. On the retention points the power cable is separated from the fiber optics.

The Fiber Optics is driven to a connection/distribution box.

The metal conductors are spliced with other metal conductors or to the connection bushing of a transformer. The parts exposed are duly insulated.

The cable in this patent supports mechanically the fiber optics to hold and protect it, therefore, it makes the fiber optics inaccessible. The fiber optics may only be accessed by cutting the cable.

In addition to the mechanical protection provided by this configuration, the cable provides electrical protection against intrusion, the concentric conductors are connected to different phases of a power system in low voltage. While the outer conductor is connected to the ground potential, breaking that layer to go to the next inner layer causes a direct short-circuit between phases. A short-circuit in a power system usually causes an explosion, triggering the electrical protections. The activation of protections warns about intrusions.

The cable described in this invention has a fiber-optic cable inside, two or more metal conductors that are insulated between each other and the ground. Each low-voltage conductor cable transmits the current from a phase of the low-voltage power system, and the cable transmits all the low-voltage power system current.

As an additional advantage that solves a long-standing issue, the use of aluminum alloy layers includes 6101 aluminum alloy wire, which has been heat treated by submitting it to a temperature ranging from 260 to 300° C. during 6-8 hours help such concentric (layer) multi-conductors avoid stretching, thus allowing to insert the fiber optics without breaking it.

Glossary

Multi-fiber fiber-optic cable: An optical fiber cable containing fiber optics. The fiber optics are gathered inside container tubes. The tubes containing the fiber optics are wired on a dielectric bearing element. A synthetic material covering is applied to the set of tubes.

Lashing wire: a wire or cord used as a mechanical support for an overhead cable. The lashing wire is tightened between 2 fixed points. It may be an electrical conductor. It may be bare or insulated.

Anti-tracking: A property of the synthetic compound material to resist surface electric discharges.

Insulators for overhead lines: a power overhead line accessory that allows fastening a low-voltage cable by means of a stemming or by compression. The insulator prevents electric discharges to the ground in normal operation conditions.

Aluminum alloy: a chemical composition where the aluminum is the prevailing element.

Anti-fraud connection: a cable of a specific built which makes it more difficult to connect conductors under voltage, for avoiding unregistered electrical connections.

Concentric conductor: a closed layer of copper or aluminum wires and their alloys around an insulated conductor or set of conductors.

Medium-voltage protected cable: an insulated overhead cable, which being live is resistant to contacts with grounded elements for short periods of time. High voltage may be measured on the cable surface. For electrical safety reasons, the permanent contact with persons and animals with live cables is not allowed. It avoids electric shocks in case of accidental contact with a live cable.

Connection box and/or cabinet: a plastic or metal cabinet, with the following elements inside: fiber-optic cables, signal conductors, low-voltage electric power conductors, devices for handling and control of networks. They provide electrical safety to the public in general, and protect the elements inside of it from external influences.

Wooden or concrete poles: are used in overhead cable networks to install signal, telephone, power lines outside the reach of the public in general. The cables are fastened with accessories, ⅒ of their length is recessed in the ground in a suitable foundation. They are characterized by the height and stress they can support without breaking on their upper end.

Insulation: an arrangement of a material separating a live element or part from another conductive element.

Self-supporting: an element supporting its own weight is its movable condition or in a static situation and needs no foreign element to stand the wiring and installation conditions.

Coverage: a copper and aluminum-and their alloy-material arrangement covering fully or partially the surface where they are arranged in a circular section cable.

Metal wire: a copper and aluminum-and their alloy-conductor obtained from drawing usually with a circular section with a diameter lower than 5.95 mm.

Drawing process: the stretching of wire in cold, successive steps by the use of diamond or tungsten carbide dies or draws whose diameter is gradually lower. Such a section decrease provides the material with certain temper thus benefiting its mechanical characteristics (temper: is the property of a metal that is translated into an increase in its hardness, fragility and tensile strength as a result of cold deformations). In wires, reductions of up to 90% can be obtained after successive passages, starting from annealed material and before a new annealing process is required for eliminating temper. The advantages provided by cold wire drawing are the following: good surface quality, dimensional accuracy, increase in resistance and hardness, and, of course, the possibility of producing very thin sections.

Rolling: Rolling is an industrial process whereby a metal sheet thickness is reduced or similar material, applying pressure by the use of different processes, such as ring-rolling or the rolling of profiles. Therefore, this process is applied to material with a good level of malleability. The equipment used for this process is known as roller Residential connection: An electrical connection by means of insulated conductor cables which supply electric power from a distribution network to certain premises at a certain point of delivery inside the place or building (connection point).

Layer of protection: Sequence of points consecutively joined around a circumference, represented by the cross-section of copper and aluminum-and their alloys-wire installed in a sequential manner, such that they complete a circumference, leaving no space between one point and the other, one next to the other.

Low-voltage electric distribution: electric power distribution service supplied by means of conductor cables arranged as main branches starting from a power transformation center, forming a network. From such distribution network cables, residential connections are made for voltage rates lower than 1 kV.

Creep effect: Permanent elongation of cables due to mechanical stresses supported on a daily basis.

Nominal section: Name given by the standard to a certain electrical section. Its value is not limitative but it is used as reference. The specific values to be met are defined in each particular standard.

The invention claimed is:

1. An overhead cable for transmission of low-voltage and medium-voltage electric power and digital signals, comprising:
   a central fiber-optic cable;
   a protective covering surrounding the central fiber-optic cable; and
   around and covering the protective covering of the central fiber-optic cable, at least one aluminum alloy layer for the transmission of low-voltage and medium-voltage electric power,
   wherein the at least one aluminum alloy layer comprises a 6101 aluminum alloy wire that has been heat treated to a temperature within a range of 260 and 300° C. to improve an elongation and inhibit breaking of the central fiber-optic cable contained within the aluminum alloy layer, and
   wherein the protective covering comprises a protective covering material selected from the group consisting of: cross-linked low-density polyethylene (XLPE), medium-density polyethylene (MXLPE), high-density polyethylene (HDXLPE), polypropylene (PP), Polyvinyl chloride-based compounds (PVC), Ethylene-vinyl acetate (EVA)-based compounds, and Ethylene propylene rubber-based elastomer compounds (EPR).

2. The overhead cable in accordance with claim 1, wherein the central fiber-optic cable is multi-fiber.

3. The overhead cable in accordance with claim 2,
   wherein the at least one aluminum alloy layer around the protective covering of the central fiber-optic cable comprises at least two aluminum alloy layers for the transmission of low-voltage and medium-voltage electric power.

4. The overhead cable in accordance with claim 2,
   wherein the at least one aluminum alloy layer around the protective covering of the central fiber-optic cable comprises at least three aluminum alloy layers for the transmission of low-voltage and medium-voltage electric power.

5. The overhead cable in accordance with claim 2,
   wherein the at least one aluminum alloy layer around the protective covering of the central fiber-optic cable comprises at least four aluminum alloy layers for the transmission of low-voltage and medium-voltage electric power.

6. The overhead cable in accordance with claim 1,
   wherein the at least one aluminum alloy layer around the protective covering of the central fiber-optic cable comprises at least two aluminum alloy layers for the transmission of low-voltage and medium-voltage electric power.

7. The overhead cable in accordance with claim 6, wherein the at least two aluminum alloy layers for the transmission of low-voltage and medium-voltage electric power are crowns.

8. The overhead cable in accordance with claim 7, wherein between each one of the at least two aluminum alloy layer crowns there is an insulating layer covering for electrically insulating the aluminum alloy layers.

9. The overhead cable in accordance with claim 8, wherein external to the insulating layer covering, there is an external insulating layer covering for insulating the overhead cable from the environment.

10. The overhead cable in accordance with claim 8, wherein the insulating layer covering for electrically insulating the aluminum alloy layers comprises a material selected from the group consisting of: low-density polyethylene (PELD), medium-density polyethylene (PEMD), high-density polyethylene (PEHD), cross-linked low-density polyethylene (HDXLPE), polypropylene (PP), Polyvinyl chloride-based compounds (PVC), Ethylene-vinyl acetate (EVA)-based compounds, and Ethylene propylene rubber-based elastomer compounds (EPR).

11. The overhead cable in accordance with claim 10, wherein the material for the insulating layer covering for electrically insulating the aluminum alloy layers is anti-tracking.

12. The overhead cable in accordance with claim 1, wherein the at least one aluminum alloy layer around the protective covering of the central fiber-optic cable comprises at least three aluminum alloy layers for the transmission of low-voltage and medium-voltage electric power.

13. The overhead cable in accordance with claim 1, wherein the at least one aluminum alloy layer around the protective covering of the central fiber-optic cable comprises at least four aluminum alloy layers for the transmission of low-voltage and medium-voltage electric power.

14. The overhead cable in accordance with claim 1, wherein the at least one aluminum alloy layer comprising the 6101 aluminum alloy wire has been heat treated to a temperature within a range of 260 and 300° C. during a minimum period of 6 to 8 hours.

15. The overhead cable in accordance with claim 1, wherein the protective covering material for the protective covering of the central fiber-optic cable is anti-tracking.

16. The overhead cable in accordance with claim 1, wherein the at least one aluminum alloy layer has drawn wire.

17. A 6101-aluminum alloy drawn wire treatment process of up to 5.95 mm in diameter, comprising steps of:
(i) introducing the 6101-aluminum alloy drawn wire of a diameter up to 5.95 mm in coils or baskets, such that the coils or baskets are delivered from a drawing machine into an air furnace at atmospheric pressure at a temperature within a range of 260° C. and 300° C.;
(ii) leaving the 6101-aluminum alloy drawn wire in the furnace until reaching thermal equilibrium during 6 to 8 hours;
(iii) taking the 6101-aluminum alloy drawn wire out of the furnace as coils or baskets after stages (i) to (ii) and leave the 6101-aluminum alloy drawn wire to cool down to ambient temperature.

18. The treatment process for the 6101-aluminum alloy drawn wire in accordance with claim 17, wherein in case a second drawing process is required, at diameters lower than 1.70 mm, the wire obtained in step (iii) is left at the ambient temperature for 48 hours before the second drawing to allow rearrangement of the crystallographic structure; then, steps (i), (ii) and (iii) are repeated.

* * * * *